(12) United States Patent
Florkey et al.

(10) Patent No.: US 6,990,353 B2
(45) Date of Patent: Jan. 24, 2006

(54) COMMUNICATION TO ONE MOBILE STATION OF UPDATE OF CALL PARTICIPATION AVAILABILITY STATUS OF ANOTHER MOBILE STATION

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Ronald Bruce Martin, Carol Stream, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 385 days.

(21) Appl. No.: 10/370,332

(22) Filed: Feb. 19, 2003

(65) Prior Publication Data

US 2004/0176100 A1  Sep. 9, 2004

(51) Int. Cl.
*H04Q 7/00* (2006.01)
(52) U.S. Cl. ............... 455/519; 455/418; 455/518; 709/238; 709/206
(58) Field of Classification Search ............... 455/519, 455/518, 515, 412.1, 466, 456.1, 418; 709/238, 709/200, 206
See application file for complete search history.

(56) References Cited

U.S. PATENT DOCUMENTS

2002/0077080 A1 * 6/2002 Greene ................... 455/412
2002/0083127 A1 * 6/2002 Agrawal ................. 709/203
2003/0083046 A1 * 5/2003 Mathis .................... 455/412
2003/0119540 A1 * 6/2003 Mathis .................... 455/518
2003/0120805 A1 * 6/2003 Couts et al. ............. 709/238
2003/0206619 A1 * 11/2003 Curbow et al. ...... 379/210.01

FOREIGN PATENT DOCUMENTS

| WO | WO 99 34628 A | 7/1999 |
| WO | WO 00 51391 A | 8/2000 |
| WO | WO 50680 A | 7/2001 |
| WO | WO 01 78425 A | 10/2001 |
| WO | WO 02 054745 A | 7/2002 |

OTHER PUBLICATIONS

"buddy list"; http://www.techweb.com/encyclopedia/defineterm?term=buddy+list; TechEncyclopedia; Computer Language Company, 5521 State Park Road, Point Pleasant, PA 18950; 1 pg.; Feb. 12, 2003.

* cited by examiner

*Primary Examiner*—Danh Cong Le

(57) ABSTRACT

An application server component of an apparatus in one example communicates to one or more mobile stations, of a plurality of mobile stations, one or more updates of one or more statuses of respective one or more mobile stations of the plurality of mobile stations. The plurality of mobile stations comprise a first mobile station and a second mobile station, wherein the one or more updates of the one or more statuses of the respective one or more mobile stations comprise an update of a status of the first mobile station. The application server component communicates the update of the status of the first mobile station to the second mobile station to indicate to the second mobile station whether the first mobile station is available for participation in a call with the second mobile station.

24 Claims, 5 Drawing Sheets

COMMUNICATION TO ONE MOBILE STATION OF UPDATE OF CALL PARTICIPATION AVAILABILITY STATUS OF ANOTHER MOBILE STATION

TECHNICAL FIELD

The invention relates generally to communications and more particularly to availability status of mobile stations.

BACKGROUND

It is desirable for a user of a mobile station to know the availability of other users of mobile stations before attempting to communicate with the other users. If the user knows the availability statuses of the other users, then the user may avoid wasting time and resources by foregoing attempts to communicate with the other users during times that the other users are unavailable.

Some personal computers employ a software application, for example, a real-time availability status presentation application, for example, AOL® Instant Messenger™ service offered by America Online, Inc. (New York, N.Y. 10019, http://www.aol.com), to notify a user of the personal computer of the status of other users in a network. If the user subscribes to the Instant Messenger™ service, then the user may establish a list, for example, a buddy list, of the other users who have also subscribed to the Instant Messenger™ service. The Instant Messenger™ service monitors the availability status of the other users on the user's buddy list and provides to the user real-time availability status updates about the other users. When one of the other users signs onto the Instant Messenger™ service, for example, the Instant Messenger™ service communicates an update of the status of that other user, for example, from "not logged on" to "logged on." The update notifies the original user that the other user is available for communication.

One shortcoming of the arrangement is that the real-time availability status presentation application is not available for the user of the mobile station to monitor the status of the other users. For example, a first user must attempt communication with a second user to determine an availability of the second user. If the first user attempts communication with the second user and the second user is unavailable, then the first user has wasted time and resources by attempting communication with the second user. Without knowledge of the availability of the second user, the first user is unable to distinguish between different causes for the unavailability of the second user. For example, the second user may be currently engaged in a call, powered off, unavailable, or not accepting calls. Without being able to distinguish between the different causes of the unavailability of the second user, the first user may make subsequent calls to the second user and continue to waste time and resources.

Thus, a need exists for enhanced information about the call status availability of mobile stations.

SUMMARY

The invention in one embodiment encompasses an apparatus. The apparatus comprises an application server component that communicates to one or more mobile stations, of a plurality of mobile stations, one or more updates of one or more statuses of respective one or more mobile stations of the plurality of mobile stations. The plurality of mobile stations comprise a first mobile station and a second mobile station, wherein the one or more updates of the one or more statuses of the respective one or more mobile stations comprise an update of a status of the first mobile station. The application server component communicates the update of the status of the first mobile station to the second mobile station to indicate to the second mobile station whether the first mobile station is available for participation in a call with the second mobile station.

Another embodiment of the invention encompasses a method. One or more statuses of respective one or more mobile telephones of a plurality of mobile telephones are monitored. The plurality of mobile telephones comprise a first mobile telephone and a second mobile telephone. An update of a status, of the one or more statuses, of the second mobile telephone is communicated to the first mobile telephone.

Yet another embodiment of the invention encompasses an article. The article comprises one or more computer-readable signal-bearing media. The article comprises means in the one or more media for monitoring one or more statuses of respective one or more mobile telephones of a plurality of mobile telephones. The plurality of mobile telephones comprise a first mobile telephone and a second mobile telephone. The article comprises means in the one or more media for communicating to the first mobile telephone an update of a status, of the one or more statuses, of the second mobile telephone.

DESCRIPTION OF THE DRAWINGS

Features of exemplary implementations of the invention will become apparent from the description, the claims, and the accompanying drawings in which:

DETAILED DESCRIPTION

Figure 1:
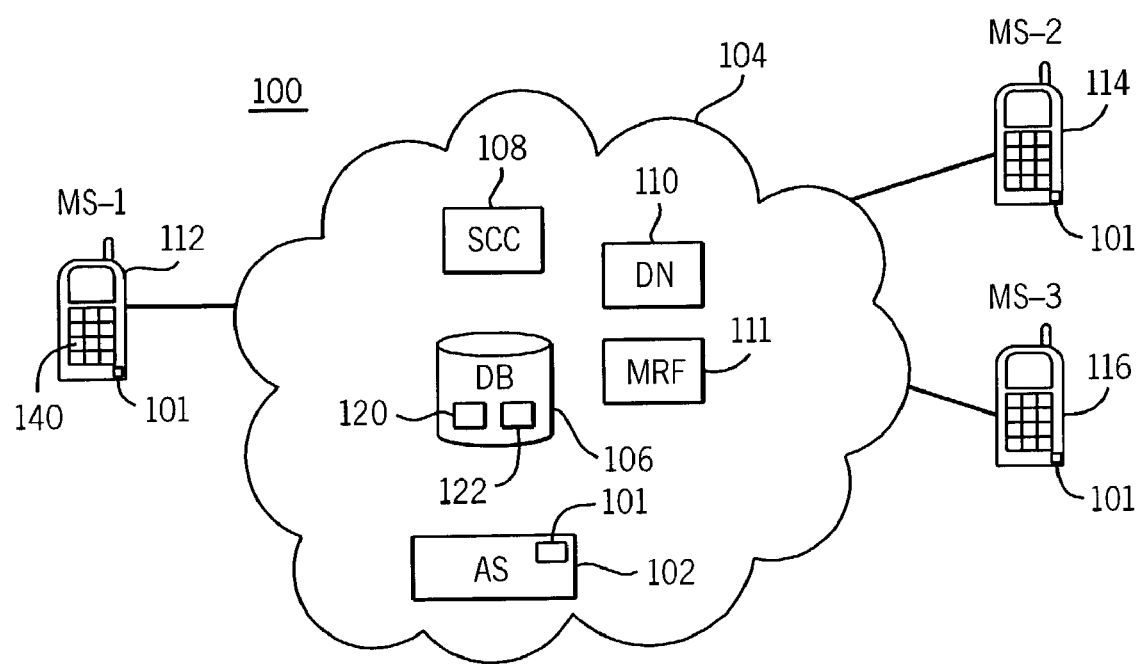
FIG. 1 is a representation of an exemplary implementation of an apparatus that comprises one or more application server components, one or more networks, one or more databases, one or more session control components, one or more data nodes, one or more media resource function components, and a plurality of mobile stations.

Turning to FIG. 1, an apparatus 100 in one example comprises a plurality of components such as computer software and/or hardware components. A number of such components can be combined or divided in the apparatus 100.

The apparatus 100 in one example comprises one or more application server ("AS") components 102, one or more networks 104, one or more databases ("DBs") 106, one or more session control components ("SCC") 108, one or more data nodes ("DNs") 110, one or more media resource function ("MRF") components 111, and a plurality of mobile stations ("MSs") 112, 114, and 116. The mobile stations 112, 114, and 116 in one example are operable by one or more users. The users of the mobile stations 112, 114, and 116 in one example comprise human operators. The application server component 102, the session control component 108, the database 106, the data node 110, and the media resource function component 111 in one example comprise computer components, for example, computer software and/or hardware components. The network 104, the database 106, the session control component 108, the data node 110, and the media resource function component 111 in one example comprise telecommunications network components.

For example, the apparatus 100 comprises a buddy list service that monitors a status (e.g., online, offline, busy, on a call) of the mobile stations 112, 114, and 116 to determine whether the mobile stations 112, 114, and 116 are available for participation in a call. A buddy list in one example comprises a user administered list of colleagues, workgroup members, and/or friends (e.g., the mobile stations 112, 114, and 116) that one of the mobile stations 112, 114, and 116 wishes to monitor via the buddy list service. The call for which availability of the mobile stations 112, 114, or 116 is determined in one example comprises one or more of voice communication, data communication, and messaging.

In one example, the application server component 102 serves to control a notification of the status of the mobile stations 112, 114, and 116 to one or more other of the mobile stations 112, 114, and 116. For example, the user of the mobile stations 112 is a subscriber to the buddy list service and administers a buddy list that comprises indications of the mobile stations 114 and 116. Upon registration of the mobile station 112 with the network 104, the application server component 102 returns the status of each member (e.g., the status of the mobile stations 114 and 116) of the buddy list to the mobile station 112.

In a further example, the application server component 102 serves to control a notification of a change in status of one of the mobile stations 112, 114, and 116 to the one or more other of the mobile stations 112, 114, and 116. For example, upon a change in the status of the mobile station 114, the application server component 102 sends a notification message to the mobile station 112. The application server component 102 sends analogous notification messages to other mobile stations (e.g., the mobile station 116) that have a buddy list that comprises an indication of the mobile station 114.

The network 104 and/or the mobile stations 112, 114, and 116 send one or more status update messages to the application server component 102 upon a change in the status of the one of the mobile stations 112, 114, and 116. The application server component 102 processes the one or more status update messages and determines which of the mobile stations 112, 114, and 116 should be notified of the change in the status of the one of the mobile stations 112, 114, and 116.

During a connection of a call from an originating mobile station of the mobile stations 112, 114, and 116 to a receiving mobile station of the mobile stations 112, 114, and 116 the originating mobile station sends a call request to the session control component 108. The call in one example comprises one or more of voice communication, data communication, and messaging. The session control component 108 passes the call request to the application sever component 102. The call request comprises an indication of one or more buddies of the buddy list of the originating mobile station. The application sever component 102 in one example may perform name-to-number resolution. For example, application sever component 102 performs a translation from an indication of the one or more buddies to an E.164 number. The E.164 number may comprise one or more of a phone number (e.g., 1-312-346-2800) and a Universal Resource Locator ("URL") (e.g., http://www.pattibrill.com). In one example, referring to FIG. 1, the application sever component 102 resides within the network 104. In another example, the application sever component 102 is external to the network 104 and communicates with the network 104 through an external communication path (not shown), as will be appreciated by those skilled in the art.

The network 104 in one example serves to provide a medium to transmit messages between the application server component 102, the database 106, the session control component 108, the data node 110, the media resource function component 111, and the mobile stations 112, 114, and 116. The network 104 in one example comprises a plurality of network devices such as routers, switches, and servers.

The database 106 in one example serves to store subscriber profiles of the one or more users of the mobile stations 112, 114, and 116. The database 106 comprises a home location register ("HLR"). The database 106 processes one or more user profile query messages from the session control component 108. Upon receipt of one of the user profile query messages from the session control component 108, the database 106 returns the user profile that corresponds to the user requested by the session control component 108. The user profile comprises information regarding services available to the user (e.g., permissions, buddy list service subscription information, conference call services, voice mail, data and voice communications) and information regarding routing of messages to the application server component 102.

The database 106 in one example comprises a first list 120 and a second list 122. In another example, the mobile station 112 stores the first list 120 and the second list 122. In one example, the first list 120 comprises a subscription list (e.g., the buddy list) for the user of the mobile station 112. The first list 120 identifies one or more of the mobile stations 114 and 116 from/about which the user of the mobile station 112 requests to receive status updates. The first list 120 comprises one or more groups. For example, the groups of the first list 120 may comprise one or more of a work group, a social group, and family group. In one example, the second list 122 comprises a reverse-subscription list (e.g., a reverse-buddy list) for the user of the mobile station 112. The second list 122 comprises a list of the users of the mobile stations 114 and 116 which list as a buddy the user of the mobile stations 112. The second list 122 identifies one or more of the mobile stations 114 and 116 that request to receive status updates from/about the mobile station 112.

The session control component 108 in one example serves as a call control function, for example, a call state control function ("CSCF"), component. The session control component 108 may establish a call between the mobile stations 112, 114, and 116. For example, the session control component 108 monitors the status of one or more of the mobile stations 112, 114, and 116 and notifies the application server component 102 upon a change in the status of at least one of the monitored mobile stations 112, 114, and/or 116.

In one example, the data node 110 serves to receive and process messages from the application server component 102. In a further example, the data node 110 serves to notify one of the mobile stations 112, 114, and 116 of a change in the status of another of the mobile stations 112, 114, and 116. The data node 110 comprises one or more of a Serving General Packet Radio Service ("GPRS") Support Node ("SGSN"), a Gateway GPRS Support Node ("GGSN"), a Packet Data Serving Node ("PDSN"), a short message service center ("SMSC"), and the call state control function component. For example, the data node 110 comprises a subpart of the session control component 108. The media resource function component 111 serves to generate announcements, play tones, and manage conference services.

The mobile stations 112, 114, and 116 in one example serve to initiate a change in the status of the mobile stations 112, 114, and 116. One of the mobile stations 112, 114, and 116 in one example serves to initiate a call to another of the mobile stations 112, 114, and 116. The mobile stations 112, 114, and 116 communicate via the network 104. For example, the mobile stations 112, 114, and 116 engage in mobile telephone communication (e.g., calls, voice mail, and short messaging services, "SMS," via the network 104. The mobile stations 112, 114, and 116 in one example comprise one or more of handheld devices, mobile telephones, cellular phones, mobile computers, and personal digital assistants ("PDAs").

In one example, the user of the mobile station 112 employs a menu to initiate a call to one or more of the mobile stations 114 and 116. In another example, the user of the mobile station 112 employs the menu to indicate a change in status of the mobile station 112. For example, the user of the mobile station 112 changes the status of the mobile station 112 from an available status to a busy status. To initiate the change in status, the user of the mobile station 112 selects a set-busy status function from the menu. In one example, the mobile station 112 notifies the session control component 108 of the change in status (e.g., when the first list 120 and the second list 122 reside in the database 106). In another example, the mobile station 112 notifies the application server component 102 of the change in status (e.g., when the first list 120 and the second list 122 reside in the mobile station 112).

Figure 2:
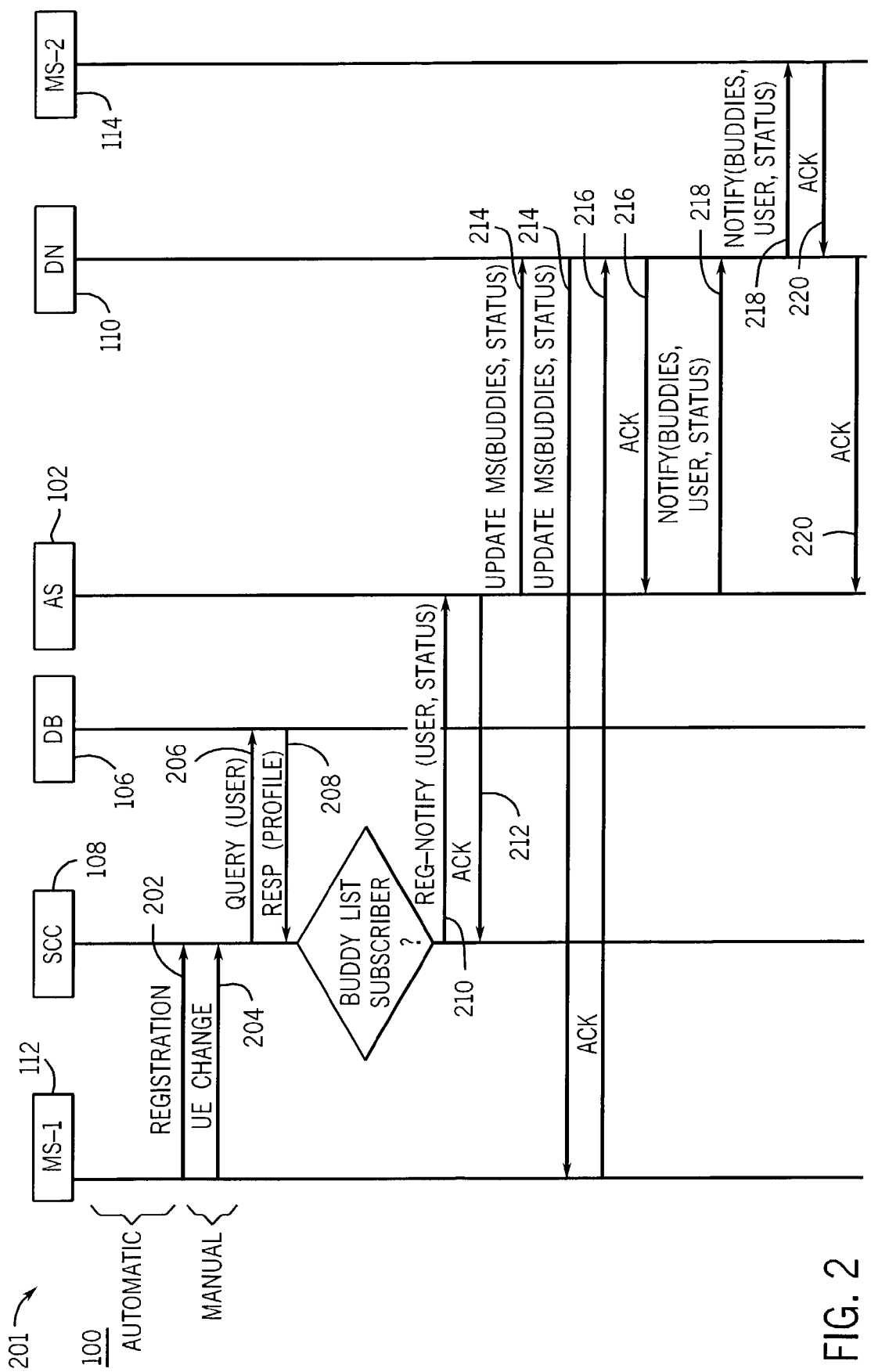
FIG. 2 is a representation of one exemplary message flow between two of the mobile stations for a registration of one of the mobile stations and notification of a change in a status of one of the mobile stations of the apparatus of FIG. 1.

Turning to FIG. 2, one illustrative description of exemplary operation of the apparatus 100 is presented, for explanatory purposes. A message flow 201 represents exemplary registration of the mobile station 112 and notification of a change in a status of the mobile station 112 based on the registration. The message flow 201 illustrates one example where the user administered buddy lists of the mobile stations 112, 114, and 116 are stored in the network 104.

In one example, the user of the mobile station 112 employs an automatic mobile-based update functionality to register the mobile station 112 with the network 104. The mobile station 112 sends a registration message 202 to the session control component 108. "REGISTRATION" in one example serves to represent the registration message 202. The message flow 201 illustrates the registration of the mobile station but is easily extendable to handle call origination or page answering by substituting an originate call or a answer page message for the registration message 202.

In another example, the user of the mobile station 112 employs a manual mobile-based update functionality to provide the status of the mobile station 112 to the network 104. The user initiates the manual mobile-based update functionality by interacting with the mobile station 112, for example, by pressing a button 140 (FIG. 1) on the mobile station 112. The button 140 in one example comprises a status-change component. The mobile station 112 sends a change in status message 204 to the session control component 108. "UE CHANGE" in one example serves to represent the change in status message 204.

Upon receipt of either of the registration message 202 or the change in status message 204, the session control component 108 sends a query message 206 to the database 106. "QUERY (USER)" in one example serves to represent the query message 206. "USER" in one example serves to represent an indication of the mobile station 112. The query message 206 initiates a download of a profile of the user of the mobile station 112 from the database 106. Upon receipt of the query message 206, the database 106 in one example sends a response message 208 to the session control component 108. "RESP (PROFILE)" in one example serves to represent the response message 208. "PROFILE" in one example serves to represent an indication of the profile of the user of the mobile station 112. The profile of the user of the mobile station 112 in one example comprises buddy list service information of the mobile station 112.

Upon receipt of the response message 208, the session control component 108 in one example determines whether the user of the mobile station 112 is subscribed to the buddy list service. If the user of the mobile station 112 is subscribed to the buddy list service, then the session control component 108 in one example sends a notification message 210 to the application server component 102. "REG-NOTIFY (USER, STATUS)" in one example serves to represent the notification message 210. "USER" in one example serves to represent an indication of the mobile station 112. "STATUS" in one example serves to represent an indication of the status of the mobile station 112. The notification message 210 informs the application server component 102 of the status of the mobile station 112. Upon receipt of the notification message 210, the application server component 102 in one example sends an acknowledgement 212 to the session control component 108.

The application server component 102 in one example sends a buddy list update message 214 to the data node 110. "UPDATE MS (BUDDIES, STATUS)" in one example serves to represent the buddy list update message 214. "BUDDIES" in one example serves to represent an indication of one or more of the mobile stations 114 and 116 on the buddy list of the user of the mobile station 112. "STATUS" in one example serves to represent an indication of the status of the one or more of the mobile stations 114 and 116 on the buddy list of the user of the mobile station 112. The buddy list update message 214 in one example provides the mobile station 112 with the status of the one or more of the mobile stations 114 and 116 on the buddy list of the user of the mobile station 112. The data node 110 forwards the buddy list update message 214 to the mobile station 112. Upon receipt of the response message 214, the mobile station 112 in one example sends an acknowledgement 216 to the data node 110. The data node 110 in one example forwards the acknowledgement 216 to the application server component 102.

Upon receipt of the acknowledgement 216, the application server component 102 in one example sends a notification message 218 to the data node 110. "NOTIFY (BUDDIES, USER, STATUS)" in one example serves to represent the notification message 218. "BUDDIES" in one example serves to represent an indication of one or more of the mobile stations 114 and 116 that comprise buddy lists that contain an indication of the mobile station 112. "USER" in one example serves to represent the indication of the mobile station 112. "STATUS" in one example serves to represent an indication of the status of the mobile station 112 (e.g., online, offline, busy, on a call). The notification message 218 provides the one or more of the mobile stations 114 and 116 with the status of the mobile station 112. The mobile station 114 in one example comprises a buddy list that contains an indication of the mobile station 112. Therefore, the data node 110 in one example forwards the notification message 218 to the mobile station 114. Upon receipt of the notification message 218, the mobile station 114 in one example sends an acknowledgement 220 to the data node 110. The data node 110 in one example forwards the acknowledgement 220 to the application server component 102. The application server component 102 in one example replicates and sends the notification message 218 to other mobile stations that comprise a buddy list that contains the indication of the mobile station 112.

Figure 3:
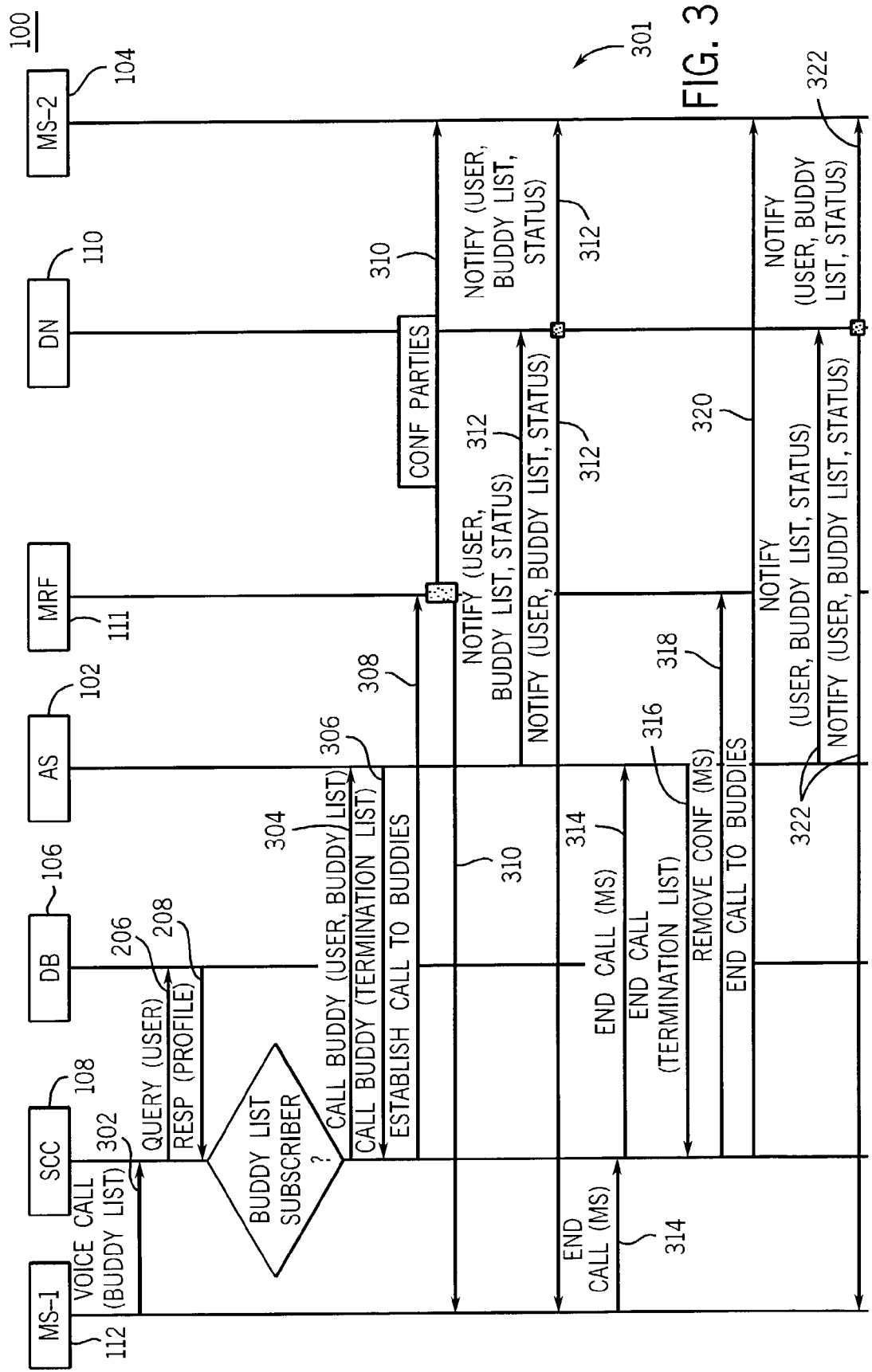
FIG. 3 is a representation of one exemplary message flow for a buddy list conference between two of the mobile stations of the apparatus of FIG. 1.

Turning to FIG. 3, another illustrative description of exemplary operation of the apparatus 100 is presented, for explanatory purposes. A message flow 301 represents an exemplary buddy list conference between the mobile station 112 and one or more members of the buddy list (e.g., the mobile station 114). The message flow 301 also represents a notification of a change in the status of the mobile station 112 and the one or more members of the buddy list based on the buddy list conference. The message flow 301 illustrates one example where the user administered buddy lists of the mobile stations 112, 114, and 116 are stored in the network 104.

The user of the mobile station 112 in one example sends buddy list conference request message 302 to the session control component 108. "VOICE CALL (BUDDY LIST)" in one example serves to represent the buddy list conference request message 302. "BUDDY LIST" in one example serves to represent an indication of one or more members of the buddy list that the user of the mobile station 112 includes in the buddy list conference.

Upon receipt of the buddy list conference request message 302, the session control component 108 in one example sends a query message 206 to the database 106. "QUERY (USER)" in one example serves to represent the query message 206. "USER" in one example serves to represent an indication of the mobile station 112. The query message 206 in one example initiates a download of the profile of the user of the mobile station 112 from the database 106. Upon receipt of the query message 206, the database 106 in one example sends a response message 208 to the session control component 108. "RESP (PROFILE)" in one example serves to represent the response message 208. "PROFILE" in one example serves to represent an indication of the profile of the user of the mobile station 112.

Upon receipt of the response message 208, the session control component 108 in one example determines whether the user of the mobile station 112 is subscribed to the buddy list service. If the user of the mobile station 112 is subscribed to the buddy list service, then the session control component 108 in one example sends a buddy list conference setup message 304 to the application server component 102. "CALL BUDDY (USER, BUDDY LIST)" in one example serves to represent the buddy list conference setup message 304. "USER" in one example serves to represent an indication of the mobile station 112. "BUDDY LIST" in one example serves to represent an indication of one or more members of the buddy list that the user of the mobile station 112 includes in the buddy list conference.

Upon receipt of the buddy list conference setup message 304, the application server component 102 in one example performs the name-to-number resolution and sends a response message 306 to the session control component 108. "CALL BUDDY (TERMINATION LIST)" in one example serves to represent the response message 306. "TERMINATION LIST" in one example serves to represent an indication of connection information (e.g., a telephone number or an internet protocol, "IP," address) of the one or more members of the buddy list that the user of the mobile station 112 includes in the buddy list conference.

Upon receipt of the response message 306, the session control component 108 in one example sends a setup message 308 to the media resource function component 111. "ESTABLISH CALL TO BUDDIES" in one example serves to represent the setup message 308. Upon receipt of the setup message 308, the media resource function component 111 in one example sends a connect message 310 to the mobile station 112 and the one or more members of the buddy list that the user of the mobile station 112 included in the buddy list conference. The media resource function component 111 in one example sends the connect message 310 to the mobile station 112 and the mobile station 114 to initiate communication between the mobile station 112 and the mobile station 114.

Once communication begins between the mobile station 112 and the mobile station 114, the application server component 102 in one example sends a notification message 312 to the data node 110. "NOTIFY (USER, BUDDY LIST, STATUS)" in one example serves to represent the notification message 312. "BUDDIES" in one example serves to represent an indication of one or more of the mobile stations 112, 114, and 116 that have buddy lists that contain an indication of the mobile station 112 or the mobile station 114. "USER" in one example serves to represent the indication of the mobile station 112 and the mobile station 114. "STATUS" in one example serves to represent an indication of the status of the mobile station 112 and the mobile station 114. Upon receipt of the notification message 312, the data node 110 in one example forwards the notification message 312 to the one or more of the mobile stations 112, 114, and 116 that comprise buddy lists that contain an indication of the mobile station 112 or the mobile station 114. The notification message 312 in one example alerts the one or more of the mobile stations 112, 114, and 116, which comprise buddy lists that contain an indication of the mobile station 112 or the mobile station 114, that the mobile station 112 and the mobile station 114 are on a call.

The communication between the mobile station 112 and the mobile station 114 in one example continues until the mobile station 112 or the mobile station 114 ends the communication. To end the communication with the mobile station 114, the mobile station 112 in one example sends an end communication message 314 to the session control component 108. "END CALL (MS)" in one example serves to represent the end communication message 314. Upon receipt of the end communication message 314, the session control component 108 in one example forwards the end communication message 314 to the application server component 102.

Upon receipt of the end communication message 314, the application server component 102 in one example sends a response message 316 to the session control component 108. "END CALL (TERMINATION LIST)" in one example serves to represent the response message 316. "TERMINATION LIST" in one example serves to represent an indication of connection information of the one or more members of the buddy list that the user of the mobile station 112 includes in the buddy list conference.

Upon receipt of the response message 316, the session control component 108 in one example sends an end buddy list conference message 318 to the media resource function component 111. "REMOVE CONF (MS)" in one example serves to represent the end buddy list conference message 318. The session control component 108 in one example also sends an end call message 320 to the one or more members of the buddy list that are involved in the buddy list conference.

Once communication ends between the mobile station 112 and the mobile station 114, the application server component 102 in one example sends a notification message 322 to the data node 110. "NOTIFY (USER, BUDDY LIST, STATUS)" in one example serves to represent the notification message 322. "USER" in one example serves to represent the indication of the mobile station 112 and the mobile station 114. "BUDDY LIST" in one example serves to represent an indication of one or more of the mobile stations 112, 114, and 116 that comprise buddy lists that contain an indication of the mobile station 112 and/or the mobile station 114. "STATUS" in one example serves to represent an indication of the status of the mobile station 112 and the mobile station 114. Upon receipt of the notification message 322, the data node 110 in one example forwards the notification message 322 to the one or more of the mobile stations 112, 114, and 116 that comprise buddy lists that contain the indication of the mobile station 112 and/or the mobile station 114. The notification message 322 in one example alerts the one or more of the mobile stations 112, 114, and 116, which have buddy lists that contain the indication of the mobile station 112 and/or the mobile station 114, that the mobile station 112 and the mobile station 114 are available for a call.

Figure 4:
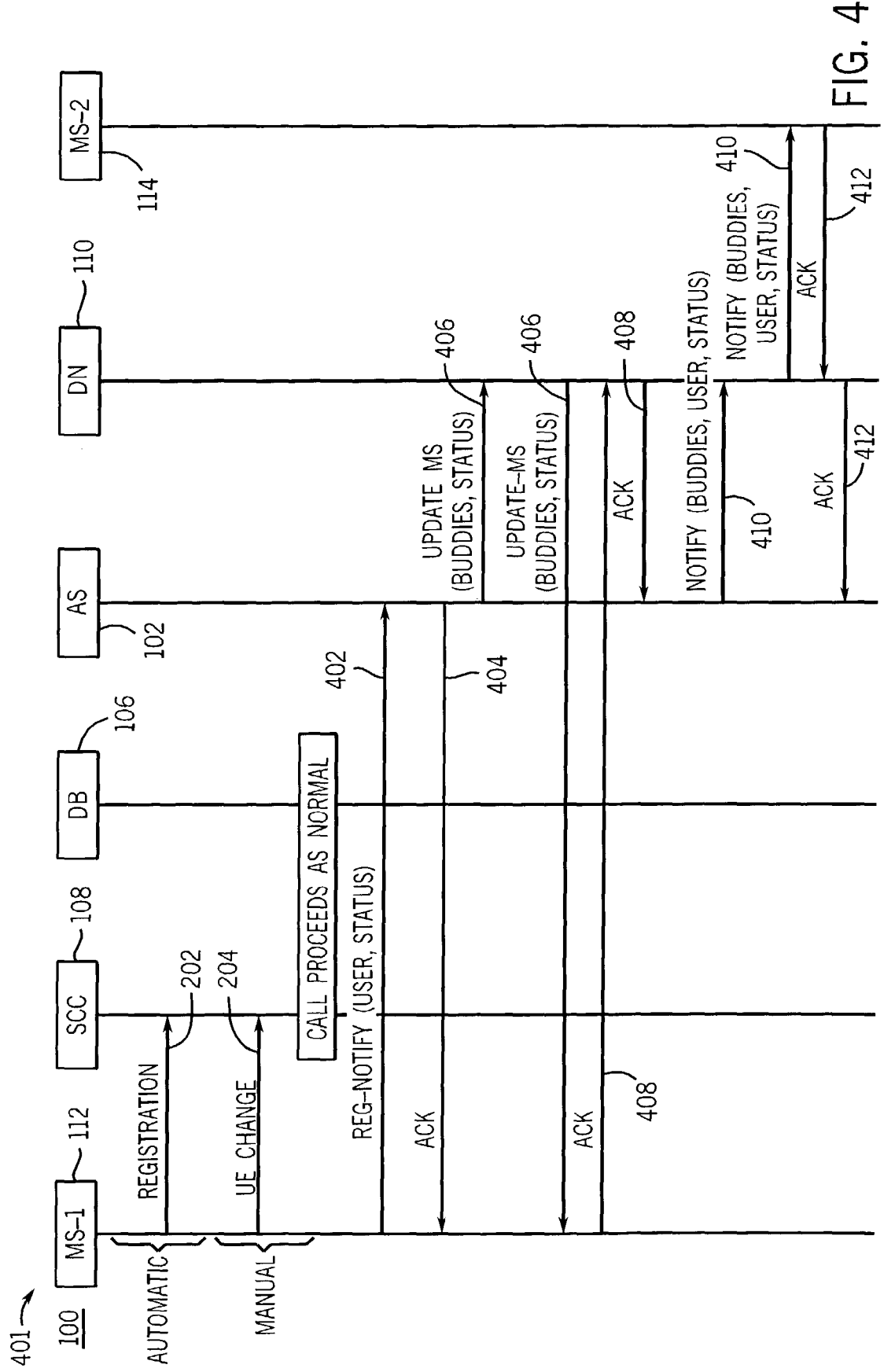
FIG. 4 is a representation of another exemplary message flow between two of the mobile stations for a registration of one of the mobile stations and notification of a change in a status of one of the mobile stations of the apparatus of FIG. 1.

Turning to FIG. 4, a further illustrative description of exemplary operation of the apparatus 100 is presented, for explanatory purposes. A message flow 401 represents an exemplary registration of the mobile station 112 and notification of a change in the status of the mobile station 112 based on the registration. The message flow 401 illustrates one example where the user administered buddy lists of the mobile stations 112, 114, and 116 are stored in the respective mobile stations 112, 114, and 116.

The user of the mobile station 112 in one example employs one of the automatic mobile-based update functionality (e.g., the registration message 202) or the manual mobile-based update functionality (e.g., status message 204) to provide the status of the mobile station 112 to the network 104, where the message flow 401 is at least in part analogous to the message flow 201. The user administered buddy list of the mobile station 112 is stored in the mobile station 112, therefore the session control component 108 in one example does not check the profile of the mobile station 112 for buddy list service subscriptions, where the message flow 401 at least in part differs from the message flows 201 and 301. The mobile station 112 in one example sends a notification message 402 to the application server component 102. "REG-NOTIFY (USER, STATUS)" in one example serves to represent the notification message 402. The notification message 402 in one example informs the application server component 102 of the status of the mobile station 112.

Upon receipt of the notification message 402, the application server component 102 in one example sends an acknowledgement 404 to the mobile station 112. The application server component 102 in one example also sends a buddy list update message 406 to the data node 110. "UPDATE MS (BUDDIES, STATUS)" in one example serves to represent the buddy list update message 406. The buddy list update message 406 in one example provides the mobile station 112 with the status of the one or more of the mobile stations 114 and 116 on the buddy list of the user of the mobile station 112. The data node 110 in one example forwards the buddy list update message 406 to the mobile station 112. Upon receipt of the response message 406, the mobile station 112 in one example sends an acknowledgement 408 to the data node 110. The data node 110 in one example forwards the acknowledgement 408 to the application server component 102.

Upon receipt of the acknowledgement 408, the application server component 102 in one example sends a notification message 410 to the data node 110. "NOTIFY (BUDDIES, USER, STATUS)" in one example serves to represent the notification message 410. The notification message 218 in one example provides the one or more of the mobile stations 114 and 116 with the status (e.g., online, offline, busy, on a call, etc.) of the mobile station 112. The mobile station 114 in one example comprises a buddy list that contains an indication of the mobile station 112. Therefore, the data node 110 in one example forwards the notification message 410 to the mobile station 114. Upon receipt of the notification message 410, the mobile station 114 in one example sends an acknowledgement 412 to the data node 110. The data node 110 in one example forwards the acknowledgement 412 to the application server component 102. The application server component 102 in one example replicates and sends the notification message 410 to any other mobile station that comprises a buddy list that contains the indication of the mobile station 112.

Figure 5:
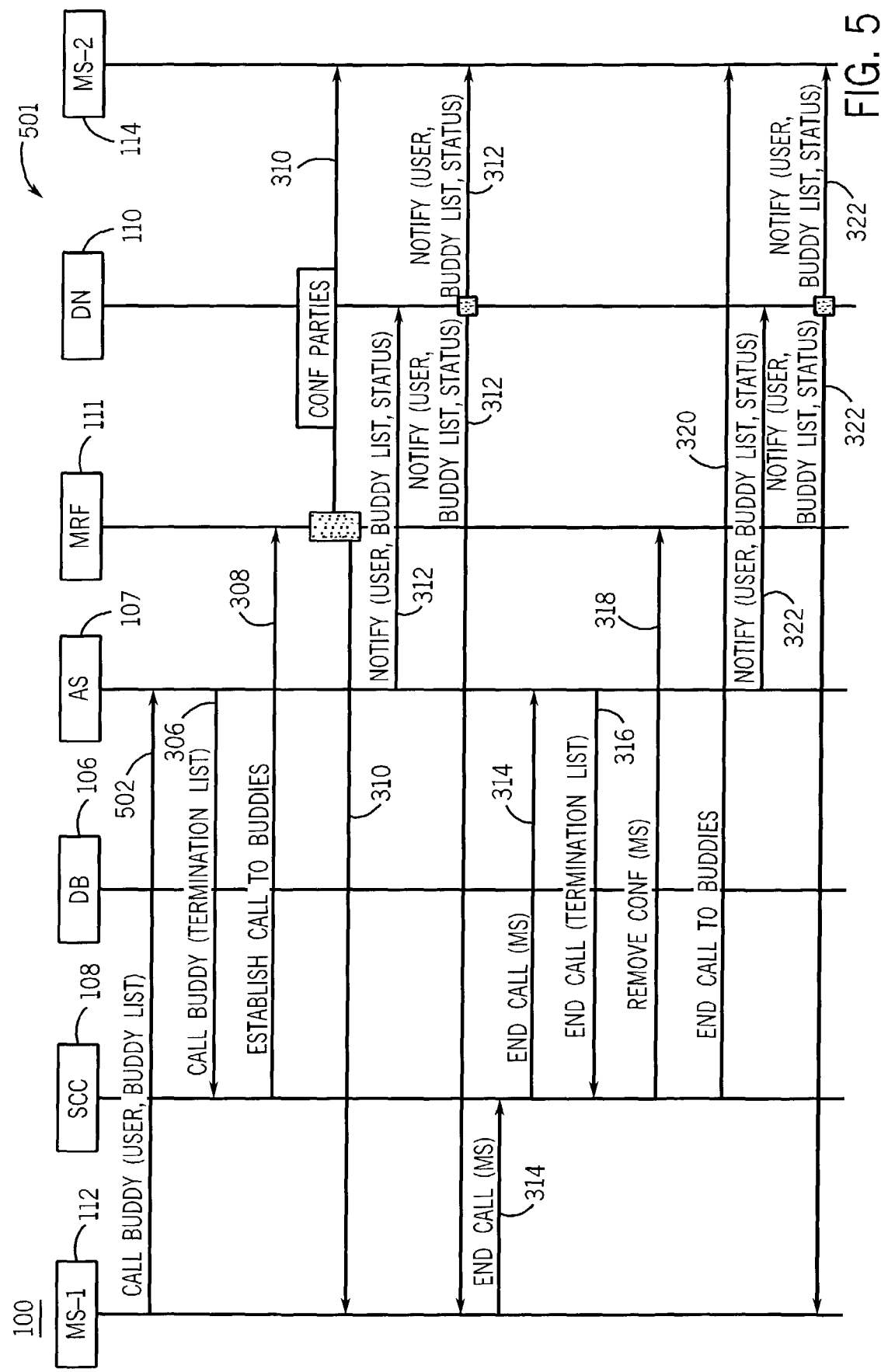
FIG. 5 is a representation of another exemplary message flow for a buddy list conference between two of the mobile stations of the apparatus of FIG. 1.

Turning to FIG. 5, a still further illustrative description of exemplary operation of the apparatus 100 is presented, for explanatory purposes. A message flow 501 represents an exemplary buddy list conference between the mobile station 112 and one or more members of the buddy list (e.g., the mobile station 114). The message flow 501 also represents a notification of a change in the status of the mobile station 112 and the one or more members of the buddy list based on the buddy list conference. The message flow 501 illustrates one example where the user administered buddy lists of the mobile stations 112, 114, and 116 reside in the respective mobile stations 112, 114, and 116.

The message flow 501 in one example is substantially analogous to the message flow 301. One difference between the message flow 501 and the message flow 301 is the user administered buddy lists of the mobile stations 112 reside within the mobile stations 112. Therefore, rather than checking the database 106 and the session control component 108 for the user administered buddy lists of the mobile stations 112, the user of the mobile station 112 in one example sends a buddy list conference setup message 502 to the application server component 102. "CALL BUDDY (USER, BUDDY LIST)" in one example serves to represent the buddy list conference setup message 502. "USER" in one example serves to represent an indication of the mobile station 112. "BUDDY LIST" in one example serves to represent an indication of one or more members of the buddy list that the user of the mobile station 112 includes in the buddy list conference. Beginning sequentially with the response message 306 and ending with the notification message 322, the remainder of the message flow 501 in one example is analogous to the message flow 301.

The apparatus 100 in one example employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   an application server component that communicates to one or more mobile stations, of a plurality of mobile stations, one or more updates of one or more statuses of respective one or more mobile stations of the plurality of mobile stations;
   wherein the plurality of mobile stations comprise a first mobile station and a second mobile station, wherein the one or more updates of the one or more statuses of the respective one or more mobile stations comprise an update of a status of the first mobile station;
   wherein one or more databases store a buddy list and a reverse-buddy list, wherein the buddy list is administered by a user of the second mobile station and comprises an indication of the first mobile station, wherein the reverse-buddy list is associated with the first mobile station and comprises a list of one or more mobile stations of the plurality of mobile stations that administer a buddy list that comprises an indication of the first mobile station;
   wherein based on an inclusion of the second mobile station on the reverse-buddy list associated with the first mobile station, the application server component communicates the update of the status of the first mobile station to the second mobile station to indicate to the second mobile station whether the first mobile station is available for participation in a call with the second mobile station.

2. The apparatus of claim 1, wherein the update of the status of the first mobile station comprises a first update of the status of the first mobile station;
   wherein the first mobile station comprises a status-change component, wherein a user of the first mobile station manually activates the status-change component to initiate communication of a change in the status of the first mobile station to the application server component;
   wherein based on the change in the status of the first mobile station, the application server component communicates a second update of the status of the first mobile station to the second mobile station.

3. The apparatus of claim 1, wherein the update of the status of the first mobile station indicates to the second mobile station that the first mobile station is available for participation in the call with the second mobile station, the apparatus further comprising:
   a telecommunications network component;
   wherein upon an involvement by the first mobile station in a call with a third mobile station of the plurality of mobile stations, the telecommunications network component communicates to the application server component the involvement of the first mobile station in the call with the third mobile station.

4. The apparatus of claim 3, wherein the update of the status of the first mobile station comprises a first update of the status of the first mobile station;
   wherein the one or more updates of the one or more statuses of the respective one or more mobile stations comprise a second update of the status of the first mobile station;
   wherein based on the involvement of the first mobile station in the call with the third mobile station the application server component communicates to the second mobile station the second update of the status of the first mobile station;
   wherein the second update of the status of the first mobile station indicates to the second mobile station that the first mobile station is unavailable for participation in a call with the second mobile station.

5. The apparatus of claim 4, wherein upon completion of the call with the third mobile station, the telecommunications network component communicates to the application server component the completion of the call with the third mobile station;
   wherein the one or more updates of the one or more statuses of the respective one or more mobile stations comprise a third update of the status of the first mobile station;
   wherein based on the completion of the call with the third mobile station the application server component communicates to the second mobile station the third update of the status of the first mobile station;
   wherein the third update of the status of the first mobile station indicates to the second mobile station that the first mobile station is available for participation in a call with the second mobile station.

6. The apparatus of claim 1, wherein the second mobile station comprises a database of the one or more databases, wherein the database stores the buddy list that is administered by the user of the second mobile station;
   wherein the application server component employs the buddy list to monitor the status of the first mobile station;
   wherein the application server component employs the buddy list to generate the update of the status of the first mobile station.

7. The apparatus of claim 1, wherein the first mobile station notifies the application server component upon a change in the status of the first mobile station.

8. The apparatus of claim 1, further comprising:
   a telecommunications network component, wherein the application server component communicates the update of the status of the first mobile station to the second mobile station through the telecommunications network component.

9. The apparatus of claim 8, wherein the telecommunications network component notifies the application server component upon a change in the status of the first mobile station.

10. The apparatus of claim 8, wherein the telecommunications network component comprises a user profile database of the one or more databases, wherein the user profile database stores the buddy list that is administered by the user of the second mobile station,
    wherein the application server component employs the buddy list to monitor the status of the first mobile station;

wherein the application server component employs the buddy list to generate the update of the status of the first mobile station.

11. The apparatus of claim 10, wherein the buddy list comprises the indication of the first mobile station and one or more additional mobile stations of the plurality of mobile stations, wherein the one or more updates of the one or more statuses of the respective one or more mobile stations comprise one or more updates of one or more statuses of the one or more additional mobile stations, respectively;
wherein the application server component employs the buddy list to monitor the one or more statuses of the one or more additional mobile stations, respectively;
wherein the application server component employs the buddy list to generate the one or more updates of the one or more statuses of the one or more additional mobile stations, respectively.

12. The apparatus of claim 8, wherein the call comprises a first call, wherein the telecommunications network component comprises a user profile database of the one or more databases, wherein the user profile database stores a reverse-buddy list that is associated with the second mobile station;
wherein the reverse-buddy list that is associated with the second mobile station comprises a list of one or more mobile stations of the plurality of mobile stations that administer a buddy list that comprises an indication of the second mobile station;
wherein the one or more updates of the one or more statuses of the respective one or more mobile stations comprise an update of a status of the second mobile station;
wherein the application server component communicates the update of the status of the second mobile station to the one or more mobile stations, that administer the buddy list that comprises the indication of the second mobile station, to indicate whether the first mobile station is available for participation in a second call.

13. The apparatus of claim 8, wherein the telecommunications network component comprises a user profile database of the one or more databases, wherein the user profile database stores the buddy list that is administered by the user of the second mobile station;
wherein upon receipt by the application server component of a call request from the second mobile station to the first mobile station the application server component translates the call request from the indication of the first mobile station to a termination address of the first mobile station.

14. The apparatus of claim 8, wherein the telecommunications network component comprises a session control component and a user profile database of the nine or more databases, wherein upon a change in the status of the first mobile station, the session control component retrieves a profile of the first mobile station from the user profile database;
wherein the session control component employs the profile to determine permissions for the first mobile station.

15. The apparatus of claim 1, wherein the plurality of mobile stations comprises a plurality of mobile telephones, wherein the first mobile station comprises a first mobile telephone of the plurality of mobile telephones, wherein the second mobile station comprises a second mobile telephone of the plurality of mobile telephones.

16. The apparatus of claim 1, wherein the call comprises any one or more of voice communication, data communication, and messaging.

17. A method, comprising the steps of:
monitoring one or more statuses of respective one or more mobile telephones of a plurality of mobile telephones, wherein the plurality of mobile telephones comprise a first mobile telephone and a second mobile telephone, wherein one or more databases store a buddy list and a reverse-buddy list, wherein the buddy list is administered by a user of the first mobile telephone and comprises an indication of the second mobile telephone, wherein the reverse-buddy list is associated with the second mobile telephone and comprises a list of one or more mobile telephones of the plurality of mobile telephones that administer a buddy list that comprises an indication of the second mobile telephone; and
communicating to the first mobile telephone, based on an inclusion of the first mobile telephone on the reverse-buddy list associated with the second mobile telephone, an update of a status, of the one or more statuses, of the second mobile telephone.

18. The method of claim 17, wherein the step of monitoring the one or more statuses of the respective one or more mobile telephones of the plurality of mobile telephones comprises the steps of:
detecting by a telecommunications network component the one or more statuses of the respective one or more mobile telephones; and
storing the one or more statuses of the respective one or more mobile telephones in a user profile database.

19. The method of claim 17, wherein the step of communicating to the first mobile telephone, based on the inclusion of the first mobile telephone on the reverse-buddy list associated with the second mobile telephone, the update of the status of the second mobile telephone comprises the steps of:
accessing the buddy list of the first mobile telephone that comprises the indication of the second mobile telephone;
retrieving the status of the second mobile telephone; and
communicating to the first mobile telephone an update of the status of the second mobile telephone.

20. The method of claim 17, wherein the step of communicating to the first mobile telephone, based on the inclusion of the first mobile telephone on the reverse-buddy list associated with the second mobile telephone, the update of the status of the second mobile telephone comprises the steps of:
receiving from the second mobile telephone an indication of a change in the status of the second mobile telephone; and
sending the indication of the change in the status of the second mobile telephone to the first mobile telephone.

21. The method of claim 20, further comprising the step of:
sending the indication of the change in the status of the second mobile telephone to one or more mobile telephones of the plurality of mobile telephones that are listed on the reverse-buddy list of the second mobile telephone.

22. The method of claim 17, further comprising the steps of:
translating a call request made by the first mobile telephone to initiate a call with a third mobile telephone of the plurality of mobile telephones from an indication of the third mobile telephone to a termination address that corresponds to the third mobile telephone; and connecting the first mobile telephone with the termination address for mobile communication with the third mobile telephone.

23. The method of claim 17, wherein the step of communicating to the first mobile telephone, based on the inclusion of the first mobile telephone on the reverse-buddy list associated with the second mobile telephone, the update of the status of the second mobile telephone comprises the step of:

notifying a telecommunications network component of a busy status of the second mobile telephone to alert one or more mobile telephones of the plurality of mobile telephones that the second mobile telephone is unavailable for mobile communication.

24. An article, comprising:

one or more computer-readable signal-bearing media;

means in the one or more media for monitoring one or more statuses of respective one or more mobile telephones of a plurality of mobile telephones, wherein the plurality of mobile telephones comprise a first mobile telephone and a second mobile telephone, wherein one or more databases store a buddy list and a reverse-buddy list, wherein the buddy list is administered by a user of the first mobile telephone and comprises an indication of the second mobile telephone, wherein the reverse-buddy list is associated with the second mobile telephone and comprises a list of one or more mobile telephones of the plurality of mobile telephones that administer a buddy list that comprises an indication of the second mobile telephone; and means in the one or more media for communicating to the first mobile telephone, based on an inclusion of the first mobile telephone on the reverse-buddy list associated with the second mobile telephone, an update of a status, of the one or more statuses, of the second mobile telephone.

* * * * *